United States Patent [19]
Jullien-Davin

[11] 3,779,688
[45] Dec. 18, 1973

[54] MOLD FOR FORMING PARTS OF COMPLEX SHAPE OF INJECTABLE OR THERMOSETTING PLASTIC MATERIAL

[75] Inventor: Jean Jullien-Davin, Valence, France

[73] Assignee: Crouzet, Paris, France

[22] Filed: May 9, 1972

[21] Appl. No.: 251,783

Related U.S. Application Data
[63] Continuation of Ser. No. 40,573, May 26, 1970, abandoned.

[30] Foreign Application Priority Data
May 29, 1969 France .............................. 6917968

[52] U.S. Cl. .............. 425/441, 425/DIG. 5, 249/66, 425/242, 425/438, 425/450 C, 425/DIG. 58, 249/184, 249/142
[51] Int. Cl. ............................................. B29c 7/00
[58] Field of Search ................... 425/242, 247, 249, 425/436, 438, 441, 444, 450, 450 C, 468, DIG. 5, DIG. 58; 249/56, 57, 58, 59, 63, 66, 67, 68, 175, 184, 180, 186

[56] References Cited
UNITED STATES PATENTS

| | | | |
|---|---|---|---|
| 3,289,252 | 12/1966 | Bromley........................ | 425/DIG. 5 |
| 3,473,197 | 10/1969 | Wilds et al..................... | 425/DIG. 5 |
| 3,564,660 | 2/1971 | Darnell .......................... | 425/DIG. 5 |
| 3,049,759 | 8/1962 | Eberhardt...................... | 425/DIG. 5 |
| 3,373,460 | 3/1968 | Lodney.......................... | 425/DIG. 5 |
| 1,475,032 | 11/1923 | Shrum et al. .................. | 425/DIG. 5 |
| 3,387,323 | 6/1968 | Wyllie et al.................... | 249/59 X |
| 3,226,771 | 1/1966 | Szugda.......................... | 425/DIG. 5 |
| 2,982,997 | 5/1961 | Peickii et al. ................. | 425/DIG. 47 |
| 3,154,978 | 11/1964 | Baker............................. | 425/DIG. 5 |
| 3,193,884 | 7/1965 | Haynie et al.................. | 425/DIG. 47 |

FOREIGN PATENTS OR APPLICATIONS

| | | | |
|---|---|---|---|
| 747,330 | 4/1956 | Great Britain................. | 425/DIG. 5 |
| 1,456,836 | 9/1966 | France........................... | 425/DIG. 5 |
| 399,723 | 3/1966 | Switzerland.................... | 425/DIG. 5 |

Primary Examiner—J. Howard Flint, Jr.
Attorney—John C. Holman et al.

[57] ABSTRACT

In a mold for casting parts of complex shape having a central core and multiple flat elements parallel to each other and in spaced relation of the same type as cam units of injectable or thermosetting plastic material and for the automatic ejection of said parts during opening of the mold which can be employed in an automatic press and comprising a stationary portion, a first group of slides which are mounted on two slide-blocks displaceable within said stationary portion in opposite directions at right angles to the movement of opening of the mold and which serve to define the interval between the elements of the molded part and a second group of slides which are mounted on two further slide-blocks displaceable in opposite directions at right angles to the first and which serve to define the profiles of said part elements, said four slide-blocks being closed in the centripetal direction in the position of closure of the mold and maintained towards the center of said mold by the conical wall of a movable cap of the mold and separated at the time of opening of the mold by inclined columns rigidly fixed to said movable cap and adapted to form ramps which are intended to cooperate with inclined bores formed in said slide-blocks, the essential property which lies in the fact that the inclined bores are of greater diameter than the columns in order to provide said oolumns with play which can be taken up at the beginning of the opening travel of the mold so that the opening of said mold can be initiated prior to commencement of lateral displacement of the slide-blocks in the centrifugal direction.

7 Claims, 4 Drawing Figures

MOLD FOR FORMING PARTS OF COMPLEX SHAPE OF INJECTABLE OR THERMOSETTING PLASTIC MATERIAL

The present application is a Continuation application of Ser. No. 40573 filed May 26, 1970, now abandoned.

BACKGROUND OF THE INVENTION

The present invention is concerned with an improved mold for forming parts of complex shape of injectable or thermosetting plastic material such as sets of cams of unit construction for washing machine programmers which call for adjustable angular settings and expedients for demolding.

It is known that provision is made in washing machine programmers for a plurality of contacts controlled by means of cams which are assembled so as to form a drum and that, in order to solve problems of low capital outlay and of accuracy of the relative angular setting of cams, consideration has been given to the construction of all the cams in a single unit.

PRIOR ART

French Pat. No. 1,399,172 with Italian priority of Oct. 7, 1963 described means for constructing said cam units in one piece by injection into a suitable mold which is provided with a series of slides in order to permit demolding of the spaces located between the different cams ; by means of a suitable device, the assembly which is thus formed can then be displaced axially by one step so as to permit opening of a series of slides for defining the cam profiles.

The means just mentioned which were employed in the prior art and which had hitherto constituted a technological improvement are no longer sufficient to meet the requirements of low cost and high production rates ; in fact, the manufacture of said means entails the presence of an operator for the purpose of removing the part from the mold after opening of this latter and provision was made for a central pin or hollow metallic sleeve on which the part was overmolded. Although this arrangement has an advantage in that it avoids the problem of extraction of the central core from a relatively delicate part, there is nevertheless a disadvantage in that is is necessary in the case of each part not only to supply said pin or sleeve but also to place said part inside the mold.

Programming of the successive demolding stages makes it necessary to make allowance for safety periods which do not permit complete opening as a result of continuous motion of the press on which the mold is mounted.

OBJECTS AND SUMMARY OF THE INVENTION

A first object of the invention is to form a mold which obviates the need for a part such as a pin or hollow sleeve and which can be employed in an automatic machine without requiring the presence of an operator, the different stages of the demolding operation including complete ejection of the part from the mold being carried out by virtye of integrated moving elements which are positively driven solely as a result of the continuous opening motion of the press.

A second object of the invention is to provide means which permit the possibility of adjustment of angular setting of predetermined elements of the cam unit. In fact, although a fixed angular setting of the cams in realtion to each other is desirable when said cams are intended to control components of a similar type such as, for example, metallic strips which are inserted in a common support, it has already been apparent for a long time that considerable difficulty is involved in providing for a fixed angular setting of optimum value between the different elements of the cam unit when the components which cooperate with said elements are of different types. For example, one of the cams may thus have to control a level of plastic material which exhibits either shrinkage or deformation after molding (not readily predictable with any degree of accuracy) and which is pivotally mounted with play on a pin fixed at a point other than the point of insertion of the metallic strips. Alternatively, the cam unit and with a set of teeth so as to be driven in step-by-step motion by means of a pawl, is provided with another set of teeth for the purpose of cooperating with a positioning member (such as an elastic pawl, for example) and has means for angular positioning of a second set of cams which are intended to undergo an axial displacement with respect to the first set.

It is understood that, if the angular settings are fixed, it will accordingly be necessary to provide very close tolerances in the case of each component including the frame and this always entails a high capital cost. If a defect is found at the time of assembly, it will also be necessary ro re-make or modify either a tool or a mold and these are highly time-consuming and expensive operations.

However, taking into account the fact that parts which are molded or cut-out in large scale production are always similar to each other even if they do not always closely conform to specifications, final adjustment will clearly take less time and provide easier if the angular setting can be carried out on the molding tool at the beginning of a production run without entailing the need to demount the tool. For example, if there is every evidence at the time of assembly that the step-by-step driving pawl is slightly too short, it will only be necessary to set the driving teeth with a slight time-lag with respect to the cams whereas on the contrary, if the positioning pawl is found to be too long, it will in that case only be necessary to set the corresponding teeth with a slight lead.

Each time the need arises in a programmer of known type to contemplate large-scale manufacture with a new set of cams (for a new customer), it will be necessary when making use of the means according to the invention to ensure that the first cam unit is correctly mounted and that the angular settings are accurate, which is only a matter of a few minutes ; the angular settings are adjusted if necessary and a test is again carried out. Final adjustment is thus completed and has not entailed any disassembly of the mold which has remained on the press and has not even required cooling. It then only remains to start the production run.

The means employed for the achievement of these two objects of the invention will now be described with reference to the accompanying drawings, in which :

DETAILED DESCRIPTION OF THE INVENTION

Figure 1:
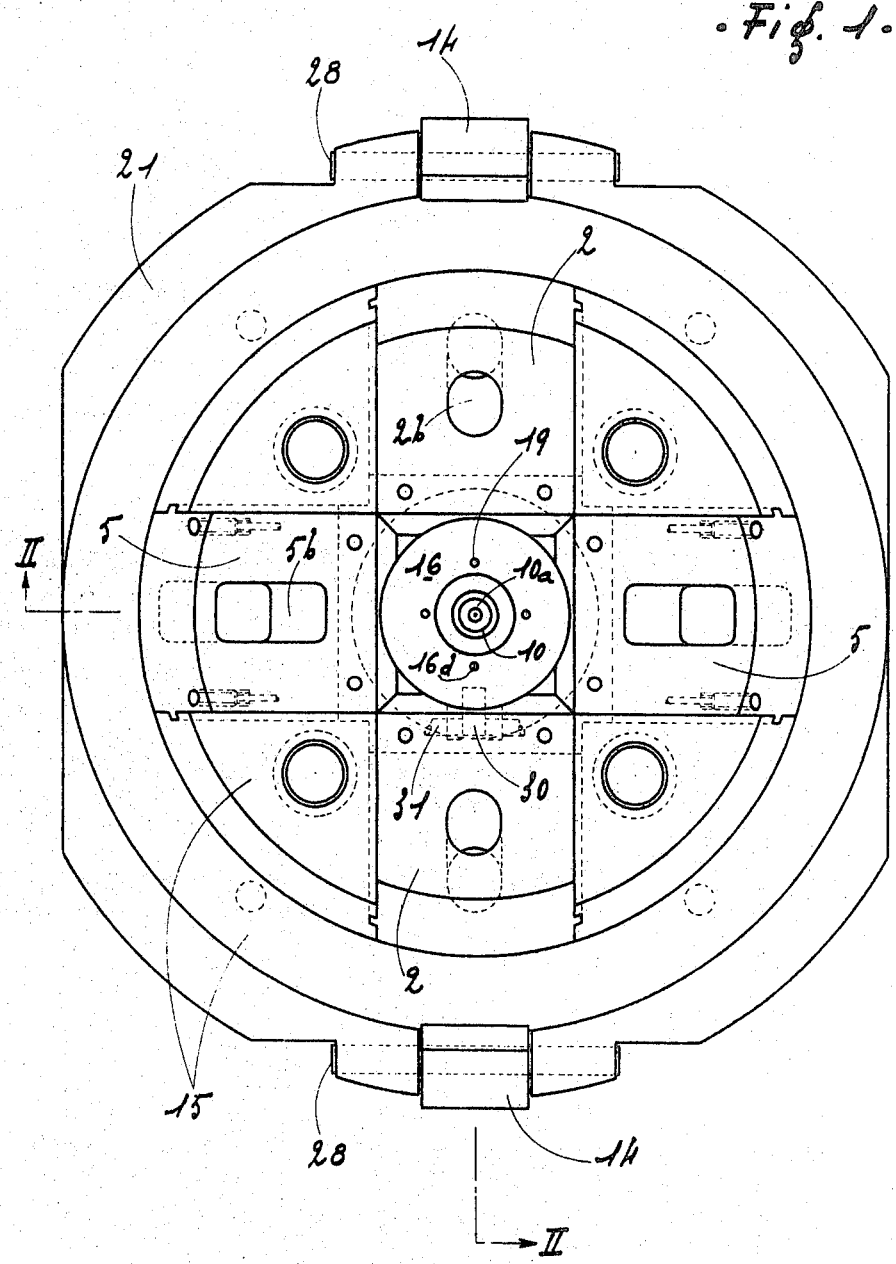
FIG. 1 shows diagrammatically a mold in accordance with the invention, the movable portion of which has been removed.
Figure 2:
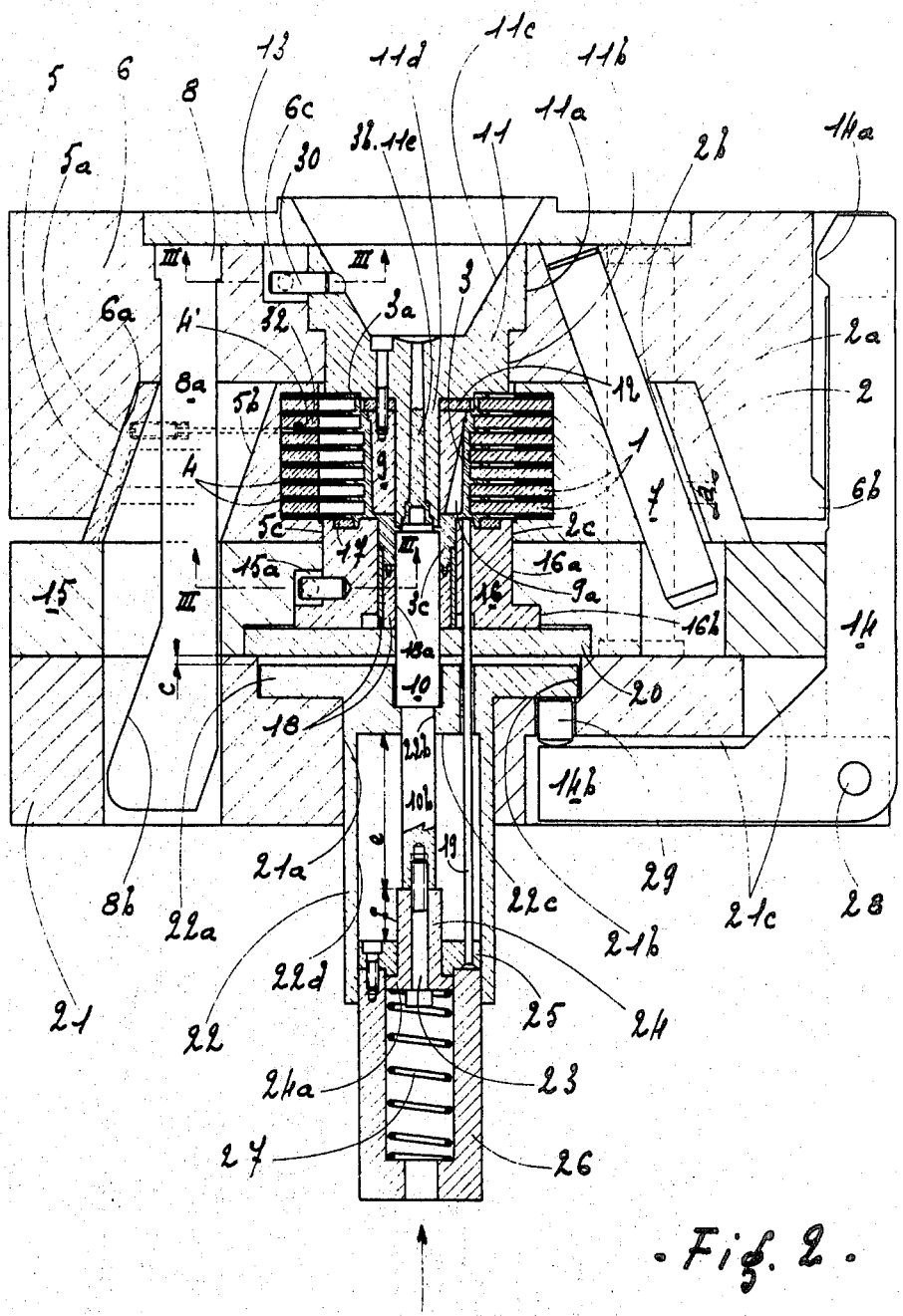
FIG. 2 is a sectional view which is taken along line II—II of FIG. 1 and serves to provide a clear understanding of the operation.
Figure 4:
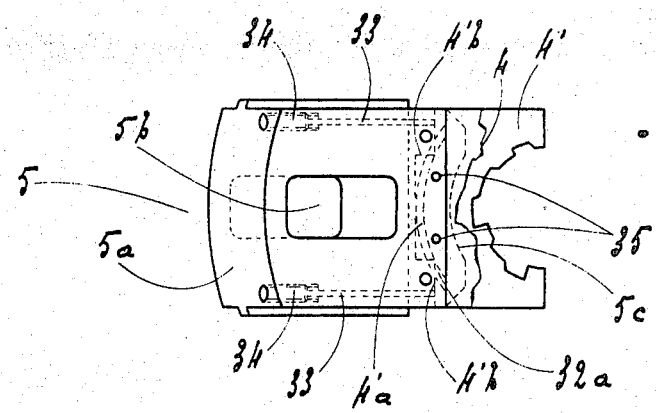
FIG. 4 is a plan view showing a slide-block in which a slide for defining the cam profile is provided with means for adjusting the angular setting of the cam.
Figure 3:
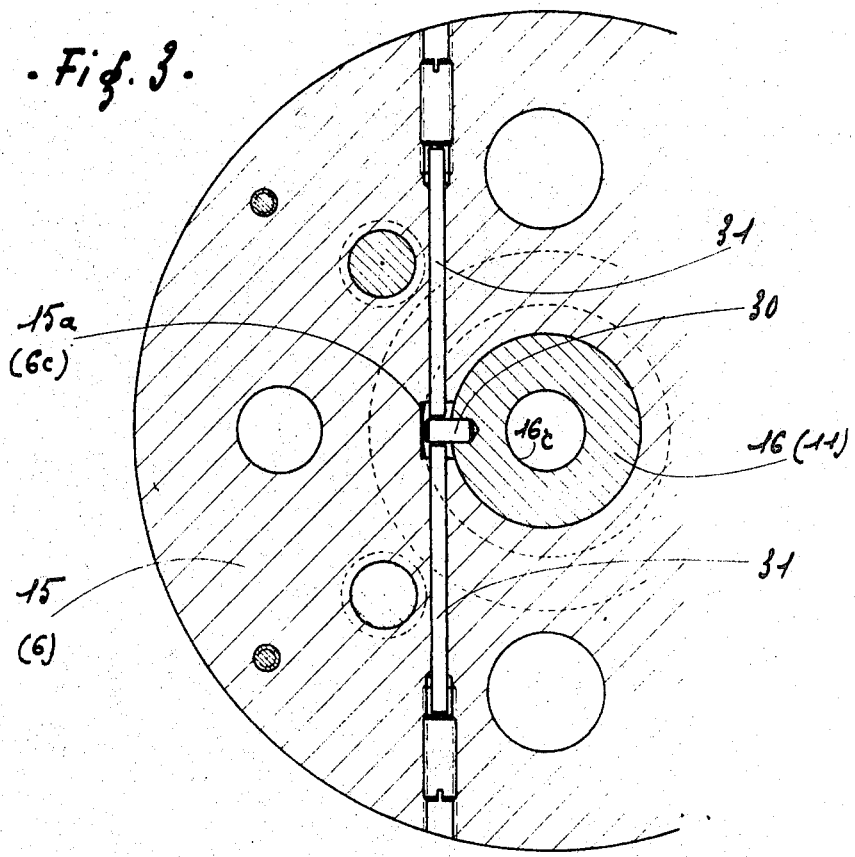
FIG. 3 is a part-sectional view which is taken along one of the lines III—III of FIG. 2 and shows the means for adjusting the angular settings of the mold elements which define the end portions of the part.

In order to achieve the first object of the invention, the mold which comprises in known manner a first series of slides 1 mounted on two slide-blocks 2 which are adapted to move in two opposite radial guides so as to define the interval between the cams 3a and a second series of slides 4 mounted on two further slide-blocks 5 which are also adapted to move in two opposite radial guides so as to define the profiles of the different cams 3a with, said four slide-blocks being each provided on the one hand, on the side located externally of the mold, with a conical portion of surface 2a and 5a in coincident relation in the position of closure of the mold with the internal conical surface 6a of a bell-head or conical cap 6 which is rigidly fixed to one of the movable portions of the mold and maintains said slide-blocks applied against each other in pairs and, on the other hand, with means known per se for displacing said slide-blocks radially at the time of opening of the mold, with said means essentially consisting of inclined bores 2b–5b adapted to cooperate with inclined columns 7, 8 which are rigidly fixed to the same movable portion of the mold, is characterized by a combination of means for carrying out the following successive steps in one complete cycle :

a. During the very first millimeters of the opening travel : initial demolding (detachment) of the central core 9 and sprue 3b while the part 3 is still firmly maintained (this operation calls for the application of a considerable effort which is incompatible with the action of some ejectors of conventional type, especially if the core is provided with ribs 9a).

b. End of extraction of the core (without effort) and simultaneous radial opening of the guide units of the slides 1 which define the intervals between the cams.

c. Displacement of the part 3 by one half-pitch so as to permit demolding of cam profiles in the only possible direction (axial direction).

d. Radial opening of the slide-blocks of the slides 4 which define the profiles.

e. Longitudinal displacement of the molded part 3 in the direction of displacement of the movable portion of the mold to an extent which is sufficient to ensure that the part is completely outside the mold cavity.

f. Disengagement of the part 3 from the supporting mandrel 10 which has brought said part away from the mold.

g. Dropping of the part 3 (horizontal press) or ejection of the part and attached sprue by means of a compressed air jet (vertical press).

h. Re-closure of the mold for a further injection (order of operations which is the reverse of the preceding).

i. Injection of another part.

The means employed for carrying out these functions are :

On the movable portion 6 of the mold, a conical cavity 6a for bringing the slide-blocks 2, 5 back towards the center when the mold is closed, two inclined columns 7 serving as ramps in order to move away from the center the slide-blocks 2 which carry the first groups of slides 1 for defining the intervals between the cams 3a, two special columns 8 essentially comprising a portion 8a which is parallel to the longitudinal axis of the mold and an inclined portion 8b which forms a ramp for displacing from the center and at the proper time the slide-blocks 5 which carry the second series of slides for defining the cam profiles, a central member 11 comprising cylindrical portions 11a, 11b having different diameters and annular shoulders for centering and positioning said member in the axial direction within the movable portion 6 of the mold, a conical recess 11c so as to receive (in known manner) the injection nozzle of the press, a cylindrical portion 11d provided with an axial injection passage 11e on which is adjusted externally the core 9 for defining the internal shape of the part to be molded with radial arms or ribs 9a and mold elements 12 for defining special details such as, for example, an internal set of teeth or a set of teeth on the outer face of the part to be molded, a backing-plate 13 for holding the central member in a stationary position.

On the exterior of the movable portion of the mold, at least one lug 6b provided with ramps for actuating in the course of its travel at least one bell-crank lever 14 which is intended to control step (c).

On the stationary portion of the mold, a base 15 provided with radial guides for the slide-blocks 2 which support the first group of slides 1, the slide-blocks 2 which are characterized in that the oblique bores 2b which cooperate with the inclined columns 7 are ovalized so as to provide play in the radial direction in order that the upper portion 6 of the mold should have a short portion of travel during which the inclined columns 7 are intended to take up the said play before beginning to drive the slide-blocks 2 in the direction of opening and thus permitting the execution of step (a) ; radial guides for the slide-blocks 5 which support the second group of slides 4 for defining the cam profiles 3a, the slide-blocks 5 being characterized in that the oblique openings 5b which cooperate with the special columns 8 are very elongated in order to permit the passage of the portions 8a which are parallel to the axis of the mold and form part of said special columns 8 while the inclined portions 8b which form ramps will act on the slide-blocks in order to initiate step (d) only when the opening of the mold is finally sufficient for completion of steps (b) and (c) ; a central member having cylindrical portions 16a–16b of different diameters and annular shoulders so as to ensure centering and positioning of said member in the axial direction within the base 15 of the stationary portion of the mold, said central member 16 being provided with mold elements 17 for defining special details such as, for example, a set of teeth on the outer face of the part to be molded and if necessary a central bore 16c in order to receive additional mold elements 18 for the purpose of defining further special details such as, for example, grooves or arms 3c for the angular positioning of another set of cams (or of a positioning member). If provision is made for mold elements 18, said elements also have a central bore 18a providing a passageway for the sliding mandrel 10 which is intended to carry the demolded part 3 away from the mold (step e). (If provision is not made for said mold elements 18, the mandrel 10 is guided directly within an axial bore of the central member 16).

The central member is provided with other bores 16d which are distributed around the central bore in accordance with requirements and provide passageways for ejector rods 19 which are intended to free the molded part 3 from the mandrel 10 at the proper time (step f); a backing-plate 20 which is embedded in the base 15 so as to provide a support for the central member 16 and the mold elements 18 which are concentric with the mandrel 10.

The stationary portion of the mold further comprises a sole-piece 21 on which the base 15 is fixed and in which provision is essentially made for a central bore 21a which is concentric with a hollowed-out portion 21b and in which is slidably mounted a sleeve 22 provided with an annular flange 22a which is fitted within the hollowed-out portion and the thickness of which is slightly smaller than the depth of said hollowed-out portion 21b; the difference defining the travel which is equal to one half-pitch makes it possible to carry out the displacement of the molded part 3 (step c).

The translational displacement mandrel 10 is always provided at the end nearest the molded part 3 with a special shape (which may be formed on the molded part if requirements so dictate). Thus, in the example shown in the drawings, said mandrel is provided with a nipple 10a (intended to form the central hole of the molded part) so that the part 3 may thus remain attached to the mandrel 10 throughout the duration of step (e). At the end remote from the molded part 3, said mandrel has a cylindrical portion 10b of smaller diameter which is adapted to penetrate into a bore 22b of the sleeve 22 so as to form a annular shoulder which limits the downward displacement of the mandrel 10 and defines its position in the axial direction. At the end of the mandrel 10 which is remote from the molded part 3, there is fixed by means of a screw 23 a cylindrical spacer member 24 having a diameter which is greater than the cylindrical portion 10b of the mandrel 10 or portion of small diameter. This difference in diameter constitutes in the assembly 10–24 consisting of mandrel and spacer member an annular shoulder which is adapted to cooperate with the end wall 22c of a lower bore 22d of the sleeve so as to limit the travel of the mandrel 10 to the value which is established in order to carry the molded part 3 away from the mold (step e).

The spacer member has an annular flange 24a on which rests a washer 25, there being mounted in said washer the ejectors 19 which are disposed parallel to the mandrel 10. The washer 25 is in turn secured to a hollow plunger 26 which is guided within the bore 22d of the sleeve 22 and contains a powerful spring 27 which applies the washer 25 in contact with the annular flange 24a and fixes the relative position of the ejectors 19 with respect to the mandrel 10 in the axial direction.

At the time of demolding, the plunger 26 is displaced in the direction of the arrow by the ejection control devices which are provided on all presses until the assembly 10–19–24–25–26 consisting of mandrel, ejectors, spacer member, washer, plunger, has completed the travel which is necesary to ensure that the spacer member 24 is abuttingly applied against the end wall 22c of the bore 22d (step e) and the mandrel 10 remains stationary. Thereupon, since the ejection devices of the press continue to produce action on the plunger 26, the assembly 26–25–19 consisting of plunger, washer, ejectors, continues to move while causing deflection of the spring 27; and the relative displacement of the ejectors 19 with respect to the mandrel 10 results in release and falling of the molded part (steps f and g).

The sole-piece 21 is further provided with at least one recessed portion 21c so as to accommodate a bell-crank lever 14 which is pivotally mounted on a pin 28, one arm of said lever being adapted to carry a feeler lug 14a so as to cooperate with the lug 6b which is placed on the exterior of the movable portion 6 of the mold while the other arm 14b of said lever is adapted to actuate a pusher 29 which is housed within a bore of the sole-piece. By producing action on he annular flange 22a, said pusher causes the displacement of the sleeve 22 over the distance permitted by the axial clearance (step c).

In order to achieve the second object of the invention, two cases are to be contemplated, depending on whether the elements which are intended to permit adjustment of angular setting are defined by the mold elements which are rigidly fixed to the central members 11–16 of the movable portion 6 and of the stationary portion 15 of the mold or by the mold elements 4 which are rigidly fixed to the slide-blocks 5 which support the slides 4.

In the first case, the solution is very simple. The central members 11, 16 are provided with a radially inserted locking-pin 30 and the movable portion 6 of the mold and base 15 of the stationary portion of the mold are both provided with a recess 6c–15a in order to accommodate said locking-pins 30. Two opposite screws 31 extend into each of said recesses at right angles to the mean position of the locking-pin 30. By slackening-off one of the screws 31 and by tightening-up the other screw, there is thus produced a sensitively controled rotation of the central member 11 or 16 and of the mold element 12 or elements 17 and 18 which are associated with said central member.

In the second case, the slides provided in order to define the elements which are intended to permit adjustment of angular setting are special slides 4' so designed as to have a circular heel 4'a, said heel being adapted to engage in a circular groove 32a of the adjacent stationary portion 32 so as to form a circular guide which is concentric with the axis of the mold. Said special slides 4' are provided with two recesses 4'b which are placed on each side and within which are applied two push-rods 33 placed within bores located in the plane of the special slides 4'. At the end located externally of the mold, the push-rod bores are tapped so as to receive screws 34 which are accessible from the exterior. By slackening-off one of the screws 34 and by tightening-up the other, one of the push-rods is moved back and the other is moved forward, thereby rotating the special slide 4' on its circular guide 4'a, with the angular setting of the corresponding element having thus been changed in a sensitive manner. When preliminary adjustments are considered to be final and the tool is intended to produce parts in very large quantities, it is recommended practice to lock the special slide 4' with respect to the fixed slides 4 by piercing one or a number of holes 35 parallel to the axis of the mold and through the entire stack of slides 4 in order to insert one or a number of locking-pins therein.

The locking-pin holes 35 are advantageously provided beforehand in the slides 4 which are not adjustable.

A portion of cylindrical surface 2c–5c is formed at the base of the slide-blocks 2–5 and coincides in the closed position of the mold with the external surface 16a of the central member 16 which projects above the base 15 so as to ensure perfect centering.

In order to carry out the angular setting of a pair of elements 4' when the slide-blocks 5 are applied against the member 16, two screws are slackened-off symmetrically with respect to the center and the two other screws are tightened-up.

An important feature of the device described in the foregoing lies in the fact that all stages of operation are controlled by means of a positive mechanical drive system with the result that no stage can begin unless the preceding stage is completed. This is not the case with systems employed in the prior art in which a number of operations were dependent on the elastic restoring action of a calibrated spring.

In the present invention, the single spring 27 is not calibrated since it is employed only for the purpose of returning free components to their rest positions and can accordingly be designed to have a distinctly excessive spring rate.

I claim:

1. A mould for the casting of parts of complex shape, having a central hub and multiple plane elements perpendicular to said hub, and parallel to each other, and spaced one from the other, of the same type as block cams, of thermo-plastic or injectable heat-hardening material; and for the automatic ejection of these parts during the opening of the mould, which can be used on an automatic moulding press; said mould having a movable part and a stationary part, first series of moulding slides mounted in the stationary part on two initial slide blocks movably arranged in opposite directions perpendicular to the movement of opening of the mould, and serving to defined the intervals between the pieces of the moulded part, and a second series of moulding slides mounted in the stationary part onto two second slide blocks movably arranged in opposite directions, at 90° from the first slide blocks and serving to define the profiles of the said plane elements of said moulded part, said movable part including a cap having an interior conical wall, said mould when in closed condition having said four slide blocks maintained tightly in the direction of the center of the mould by means of said interior conical wall of said cap, and separated, when the mould is opened, by columns adjoining the cap and having parts forming ramps for coacting with an oblique bore provided in each of said slide blocks, the oblique bores being of larger diameter than the columns to provide the columns with play at the beginning of the opening of the mould, so that said opening may begin before the start of the radial shifting of the first and second slide blocks from the center, each of the columns controlling the second slide blocks having an elongated portion which is parallel to the movement of the cap of the mould and an inclined portion which acts on the second slide blocks only after the radial shifting of the first slide blocks, a bell crank lever pivotally mounted on the stationary portion of the mould, an oblique lug secured to the cap for engagement by one arm of the lever, and ejector means activated by the engagement therewith of the other arm of the lever when the lug engages said one arm to shift the moulded part axially a distance of half of an interval between adjoining elements of the moulded part, the axial shifting occurring between the two above-mentioned shiftings of the slide blocks, the axis of the cap having a cylindrical sleeve sliding in the stationary part of the mould in the direction of the movement of the movable part of this mould, said sleeve, having a flange said ejector means including a pusher, said flange being directed, by means of said pusher from said other arm of the lever shifting a limited amount and driving in the direction of the mould opening an ejection mandrel, placed on said axis; being set into motion by ejector rods.

2. The mould as claimed in claim 1, wherein arranged at the side of the flange is a sliding sleeve which is in a closed position, and having a base provided with a hole with two bores defining a shoulder which, in the ejection direction, acts upon a corresponding shoulder of the ejection mandrel; the extremity of the sleeve, opposite from the base, serving as guide to an ejection piston, capable, when moving, of acting on the ejector rods and on the ejection mandrel.

3. The mould as presented in claim 1, wherein in order to realize the angular regulation of the slide and slide blocks units serving to define the profile of the elements of the moulded part, the mould has at least one cylindrical part positioned on an axis and linked to a radial bolt; the angular position of the bolt being adjustable, from the outside, by opposing stop screws engaged in tapped holes of a non-rotational part of the mould.

4. The mould as claimed in claim 1, wherein auxiliary slides are inserted between the slides of at least one series of slides defining the profiles of the elements of the moulded part; and wherein said slides are adjustably arranged at an angle to allow for an angular wedging of certain of said elements.

5. The mould as claimed in claim 4, including means allowing the angular adjustment of at least one pair of auxiliary slides in relation to the slides with which they alternate, said auxiliary slides each having a circular guide rim with angular position adjustable from the outside of the mould, by stopscrews, engaged in tapped parallel holes in the corresponding slide block.

6. The mould as presented in claim 1, wherein arranged at the side of the flange is a sliding sleeve which is in a closed position, and having a base provided with a hole with two bores defining a shoulder which, in the ejection direction, acts upon a corresponding shoulder of the ejection mandrel; the extremity of the sleeve, opposite from the base, serving as a guide to an ejection piston, capable, which moving, of acting on the ejector rods and on the ejection mandrel, a cylindrical portion of the ejection mandrel having small diameters is part of a cross-bar and a flange above which a washer is fixed to the ejector piston; the piston being slidably arranged in the sleeve, the washer being a part of the ejector rods; and a hydraulic coil inserted between the base of the piston and the flange of the cross-bar.

7. The mould as presented in claim 6, wherein in order to disengage the moulded part brought out of the mould from the mandrel; the cross-bar presents a section of larger diameter than the lower section of the small diameter of the mandrel forming a stopper against the base of the sleeve; whereby during the forward progress of the ejector piston, and to stop the ejection movement of the mandrel, due to the give of the coil, there is a continuing movement of ejection rods pushed back by the ejector piston.

* * * * *